Figure 1:
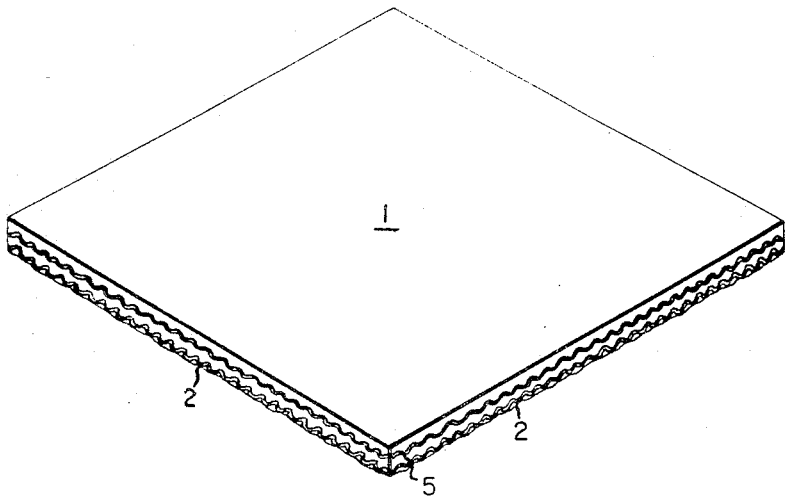
Figure 2:
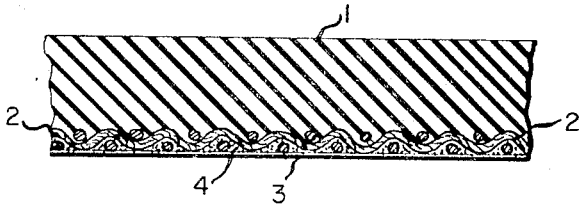

T861052

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1355

650,439

FABRIC SURFACED HYDROCARBON RUBBER LAMINATE AND PROCESS OF PREPARING SAME

Kenneth Vincent Martin, Newark, Del., assignor to E. I. du Pont de Nemours and Company, Wilmington, Del., a corporation of Delaware

Filed June 30, 1967. Published Apr. 29, 1969
Int. Cl. D06n *3/10, 7/06*
U.S. Cl. 161—96
1 Sheet Drawing. 7 Pages Specification

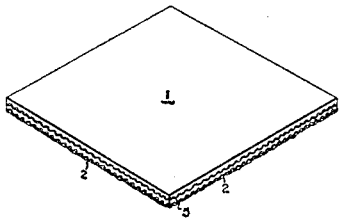

A laminated element comprising a vulcanized hydrocarbon rubber slab having a textile fabric partially embedded in at least one surface. The laminated element is prepared by vulcanizing a slab of EPDM rubber, styrene/butadiene rubber or neoprene having a woven or nonwoven fabric partially embedded in one surface. This element can be bonded to a rigid member by applying an adhesive to the fabric and laminating the element to the rigid member. Useable adhesives are molten asphalt or neoprene contact cement.

In an alternative embodiment, a second layer of fabric may be fully embedded in the body of the rubber slab. This aids in counteracting any tendency of the surface layer of the fabric to curl the rubber slab.

The laminated element of this invention can be used as the running surface or the resilient base of a race track or an athletic field. Other uses include preparation of gym floors, sidewalks or basements.

April 29, 1969 K. V. MARTIN DEF. PUB.

T861052

FABRIC SURFACED HYDROCARBON RUBBER LAMINATE
AND PROCESS OF PREPARING SAME
Filed June 30, 1967

SN-650439

INVENTOR
KENNETH VINCENT MARTIN

BY Walter A. Steinbrenner

ATTORNEY